US011483723B2

(12) United States Patent
Stawiarski et al.

(10) Patent No.: US 11,483,723 B2
(45) Date of Patent: Oct. 25, 2022

(54) DYNAMIC FACILITATION OF TRAFFIC STEERING FOR 4G, 5G, AND OTHER NEXT GENERATION NETWORKS

(71) Applicants: AT&T Intellectual Property I, L.P., Atlanta, GA (US); AT&T Mobility II LLC, Atlanta, GA (US)

(72) Inventors: Slawomir Stawiarski, Carpentersville, IL (US); Arthur Brisebois, Cumming, GA (US); Vladimir Gusavac, Dunwoody, GA (US); Jing Xu, Danville, CA (US); Prasanna Thulasiram, Bothell, WA (US); Manish Vaishnav, Naperville, IL (US); Richard Caine, Livermore, CA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/797,816

(22) Filed: Feb. 21, 2020

(65) Prior Publication Data
US 2021/0266762 A1    Aug. 26, 2021

(51) Int. Cl.
*H04L 12/26* (2006.01)
*H04W 24/02* (2009.01)
*H04W 8/18* (2009.01)
*H04W 8/04* (2009.01)
(Continued)

(52) U.S. Cl.
CPC ............ *H04W 24/02* (2013.01); *H04W 8/04* (2013.01); *H04W 8/183* (2013.01); *H04W 8/20* (2013.01); *H04W 24/08* (2013.01)

(58) Field of Classification Search
None
See application file for complete search history.

(56) References Cited

U.S. PATENT DOCUMENTS

2011/0255404 A1* 10/2011 Kafka .................... H04L 43/16
370/232
2017/0359759 A1* 12/2017 Brown .................. H04W 48/12

OTHER PUBLICATIONS

"LTE; Evolved Universal Terrestrial Radio Access (E-UTRA); User Equipment (UE) procedures in idle mode". 3GPP TS 36.304 version 13.0.0 Release 13, Feb. 2016. 44 pages.

(Continued)

Primary Examiner — Gary Lafontant
(74) Attorney, Agent, or Firm — Amin, Turocy & Watson, LLP

(57) ABSTRACT

For carrier's that have a large number of user equipment (UE) devices camped on them, the experience of a user equipment devices that utilize a subscriber prioritization identity (SPID) can be of a lower quality than it would be on another lower priority carrier because of the carrier load. Thus, SPID based UEs can be placed on carriers with the best throughput potential in the uplink. To achieve this, a SPID profile for the SPID based UE can be dynamically changed such the SPID based UE can transition to a carrier of better quality. UE devices are grouped per SPID ranges and each SPID has assigned cell carrier priority. In one embodiment, a system optimization network can monitor and detect UE performance on each cell and determine which cells are underperforming and which cells are performing better than other cells.

20 Claims, 12 Drawing Sheets

(51) Int. Cl.
    *H04W 24/08*     (2009.01)
    *H04W 8/20*     (2009.01)

(56)     References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)" 3GPP TS 36.300 V15.8.0, Dec. 2019. 365 pages.

\* cited by examiner

DYNAMIC FACILITATION OF TRAFFIC STEERING FOR 4G, 5G, AND OTHER NEXT GENERATION NETWORKS

TECHNICAL FIELD

This disclosure relates generally to facilitation of traffic steering. For example, this disclosure relates to facilitating traffic steering based on cell carrier prioritization for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating traffic steering based on cell carrier prioritization is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
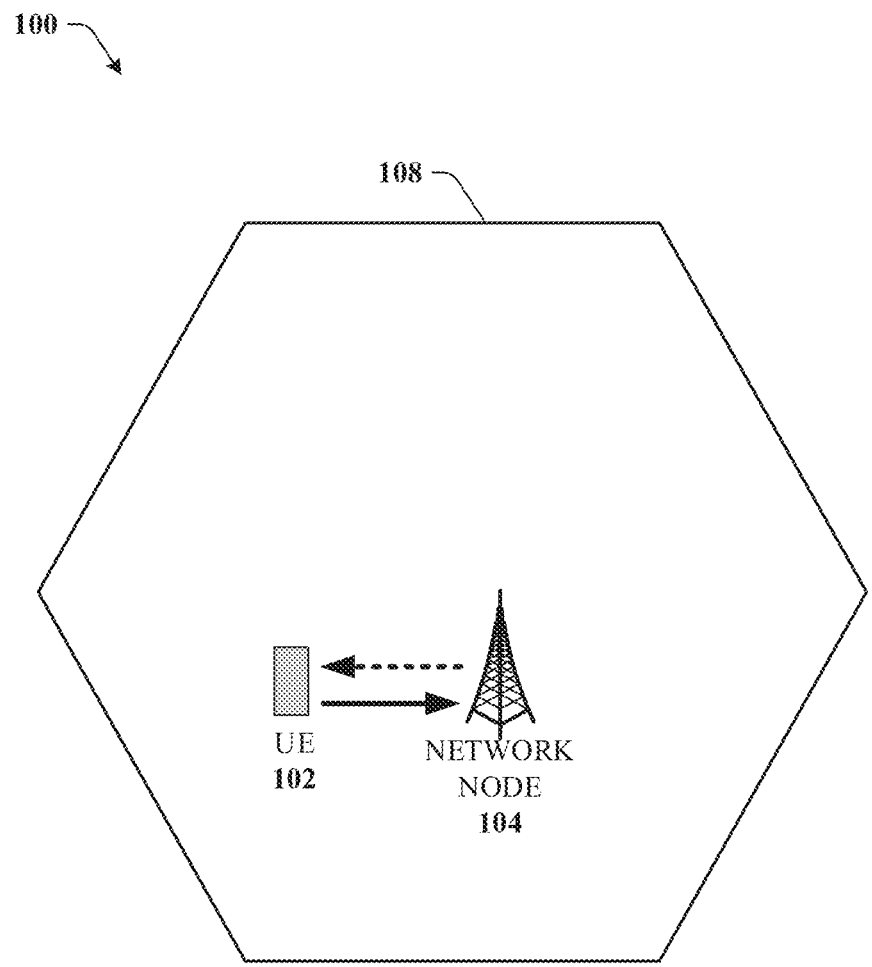
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate traffic steering based on cell carrier prioritization for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.xx technology. Additionally, substantially all aspects disclosed herein can be exploited in legacy telecommunication technologies.

Described herein are systems, methods, articles of manufacture, and other embodiments or implementations that can facilitate traffic steering based on cell carrier prioritization for a 5G network. Facilitating traffic steering based on cell carrier prioritization for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

In LTE and 5G systems UE devices in idle mode can select cells based on a minimum radio signal level criteria set per cell and/or based on cell carrier prioritization, which can be broadcasted by each cell on a system information broadcast (SIB)3/5 message. The UE device can select a cell which fulfils a minimum signal level requirement and which SIB3/5 has the highest priority. This means that if there are multiple cells measured, the UE may not always choose the cell which has the best RF signal, but it can choose the cell with the highest priority among all cells which fulfil a minimum signal level selection criteria. The cell carrier prioritization can apply to all devices uniformly unless a subscriber priority identification (SPID) is used. LTE and 5G systems can use SPID to overwrite cell prioritization broadcasted on SIB with cell prioritization assigned to specific SPIDs. The cell prioritization assigned to the SPID can apply to the UEs which are assigned to that SPID, and all other devices may not be affected. SPID assignment can be performed in a home location register (HLR) core network or in a mobility management element (MME)/authentication management function (AMF). Use of the SPID is optional, and when it is used, every cell can be provided with a SPID and configured with an associated cell priority value. If the cell is not configured to use SPID, then the UE devices can use cell prioritization broadcasted in the SIB message. The SPID can be allocated to a specific UE device based on its group classification profile (e.g., FirstNet group, police group, ambulance group, emergency room group, an enterprise customer A group, an enterprise customer B group, etc.). Currently, the cell carrier prioritization and SPID allocation can be static. SPID assignments may not change based on customers and cell carrier prioritization configuration in the cells can remain the same until manually changed by a network operating team. The static allocation of the SPID and the cell prioritization means that the same group of users will always be prioritized to the same cell carrier, which may not be optimal for their service type, performance of the network (e.g., throughput speed), cell capacity, and/or any other criteria used to determine network or service performance.

This disclosure conveys two solutions which address and resolve limitations by facilitating dynamic changes of cell prioritization allocated to a SPID on a per cell basis (depending on policy defined by operator dynamic configuration) or modification of existing SPID groups and allocation of UE devices to the groups based on the desired policy defined by the operator using a closed loop self-optimizing network architecture and automation of SPID configuration, creation, and related cell priority management. The two solutions can be used together or separately depending on what problem needs to be solved. Both solutions can leverage 3GPP standardized RAN functions for idle mode cell prioritization using SPID.

Dynamic change of cell carrier priority per SPID can be facilitated when the UE devices that are in idle mode select (e.g., camp on) a cell based on cell carrier priority. The UE devices can be grouped by SPID ranges and each SPID can comprise an assigned cell carrier priority. Cells can be monitored (near real-time, or periodically) to assess UE performance on each cell by a system optimization network (SON) automation monitoring system or any network performance monitoring system or service performance monitoring system. The detection module (e.g., in SON) can find cells that are underperforming and/or cells that are performing better than other cells. The performance can be assessed on a per cell basis for all UEs, or a per cell basis and per SPID or UE basis for more granularity. The optimization module (e.g., in SON) can apply an algorithm to determine a new cell priority allocation per SPID for the cell carriers in a sector (e.g., group), which can lead in a re-distribution of the UE devices per SPID group to a better cell carrier.

Cell carrier prioritization parameters of SPID can be configured on a cell-by-cell basis using interfaces provided by network vendors. As soon as new parameter values are applied in the network nodes, the change can take effect and the UE devices can begin to transition between (e.g., re-select) cell carriers based on the new cell carrier priority scheme per SPID. The automation system (e.g., SON) can monitor all or a selected group of network nodes (decided by operator) constantly or periodically and optimization can be performed at any time when optimization trigger criteria are met. Optimization trigger criteria can be operator defined and can be driven to ensure that a specific group of users (SPID) have an expected grade of service (e.g., high speed upload (uplink (UL)) data connection, optimal video experience, high speed download data connection, low latency, and/or others. The UE devices in idle mode select a cell based on cell carrier priority and minimum cell selection and reselection signal level criteria. UE devices can be grouped per SPID ranges and each SPID can be assigned a cell carrier priority. In this solution, the monitoring and detection system (e.g., SON) can assess UE performance on each cell and determine cells that are underperforming and/or cells that are performing better than other cells.

The cell performance can be assessed on a per cell basis for all UEs, or per cell basis and per SPID or UE basis. For more granularity, the optimizer (e.g., SON) can define new SPID group(s) in an MME/AMF or HLR and assign selected UE devices to the new SPID group(s). The selection of the UE devices to a SPID can be dynamic and can be node based, area based, or network based. The UE devices can be added to or removed on demand from new SPID(s) based on optimization parameters. The selection of the UE devices to a new SPID can be based on a UE performance experience, UE user requirements (e.g., voice, video, data streaming on uplink or downlink, type of device, 5G or non5G, enterprise customers, first responders, etc.). A new (e.g., temporary) SPID(s) can be utilized to assign a cell carrier priority to SPID(s) based on optimization the optimization parameters. By defining new SPID(s) and dynamic assignment of UE devices to SPIDs and customizing cell carrier priorities per SPID, a subset of UE devices can be steered to specific cell carriers instead of the whole set of the UE devices. The automation system (e.g., SON) can monitor all or selected group of network nodes (decided by operator) constantly or periodically and optimization is performed at any time when optimization trigger criteria are met.

A cell carrier priority value can be assigned to each carrier based on bandwidth, frequency, etc. 3GPP defines a cell priority range between 0-7, where 0 is the lowest priority and 7 is the highest priority. 3GPP also defines 256 SPID ranges (1-256) and "none" for devices which are not belonging to any SPID group. This allows the traffic to be managed and/or allocated between various carriers. For example, for a wide bandwidth carrier with a high potential throughput it can be assigned a highest priority to ensure that as many UEs connect to the wider carrier as possible as long as those devices meet a minimum signal level for cell selection or reselection criteria. Then the other carriers can be loaded based on a priority assigned to those carriers. UEs that do not have an assigned priority (e.g., a subscriber priority identity (SPID)) can follow the SIB broadcasted cell carrier priority. However, SPID can allow the priorities to be customized such that a dedicated UE group can be transferred to a different carrier outside of the base priority. Thus, the basic network configuration can be deviated based upon a specific group of UEs that have a specific SPID profile. Different carriers can have different coverage and power assignment based on bandwidth. Lower frequencies typically propagate further and have wider footprint than higher frequencies. For example, narrow carriers have a higher output power per unit spectrum than wider carriers. However, UE's can transition between carriers based on coverage. If a UE is on a wideband carrier that has a small footprint other UEs being placed there that won't have reasonable service. But those UEs can be allowed to go to a carrier with a lower priority but a bigger physical footprint. Thus, this disclosure allows UEs to maintain reasonable RF conditions by moving between carriers that are different from the direct priorities. If the RF environment is good on all the carriers, then the priority will always move the UE to highest priority carrier. The SPID of the UEs provide a preference for what type of priority the UE is looking for.

In one embodiment, described herein is a method comprising grouping, by a network device comprising a processor, mobile devices in accordance with subscriber priority identity range data representative of a subscriber priority identity range based on subscriber prioritization identity data representative of a subscriber prioritization identity. The method can comprise monitoring, by the network device, a network cell of a wireless network to assess a performance of a mobile device of the mobile devices within the network cell. Additionally, based on the performance of the mobile device, the method can comprise determining, by the network device, cell priority allocation data representative of a cell priority allocation associated with the subscriber prioritization identity, the determining resulting in a prioritization parameter. Furthermore, in response to the determining, the method can comprise sending, by the network device, the prioritization parameter to a base station device to redistribute a wireless communication of the mobile devices.

According to another embodiment, a system can facilitate grouping mobile devices of a wireless network in accordance with a defined subscriber priority identity range based on subscriber prioritization identity data associated with a subscriber prioritization identity. The system can facilitate monitoring a network cell device of a network cell of the wireless network to assess a performance of a mobile device of the mobile devices using the network cell device. Based on the performance, the system can facilitate determining cell priority allocation data associated with a cell priority allocation associated with the subscriber prioritization identity, resulting in a prioritization parameter. Furthermore, in response to the determining, the system can facilitate sending the prioritization parameter to a base station device of the wireless network to distribute a wireless communication of at least one of the mobile devices.

According to yet another embodiment, described herein is a machine-readable storage medium that can perform the operations comprising grouping mobile devices of a wireless network in accordance with a subscriber priority identity range, resulting in a first group of mobile devices based on a subscriber prioritization identity. The machine-readable storage medium can perform the operations comprising monitoring a network cell of the wireless network to determine a performance metric representative of a performance of the first group of mobile devices within the network cell. Furthermore, the machine-readable storage medium can perform the operations comprising determining a second group of mobile devices based on the performance of the first group. Additionally, the machine-readable storage medium can perform the operations comprising selecting a mobile device to be grouped with the second group of mobile devices in response to the determining the second group of mobile devices.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
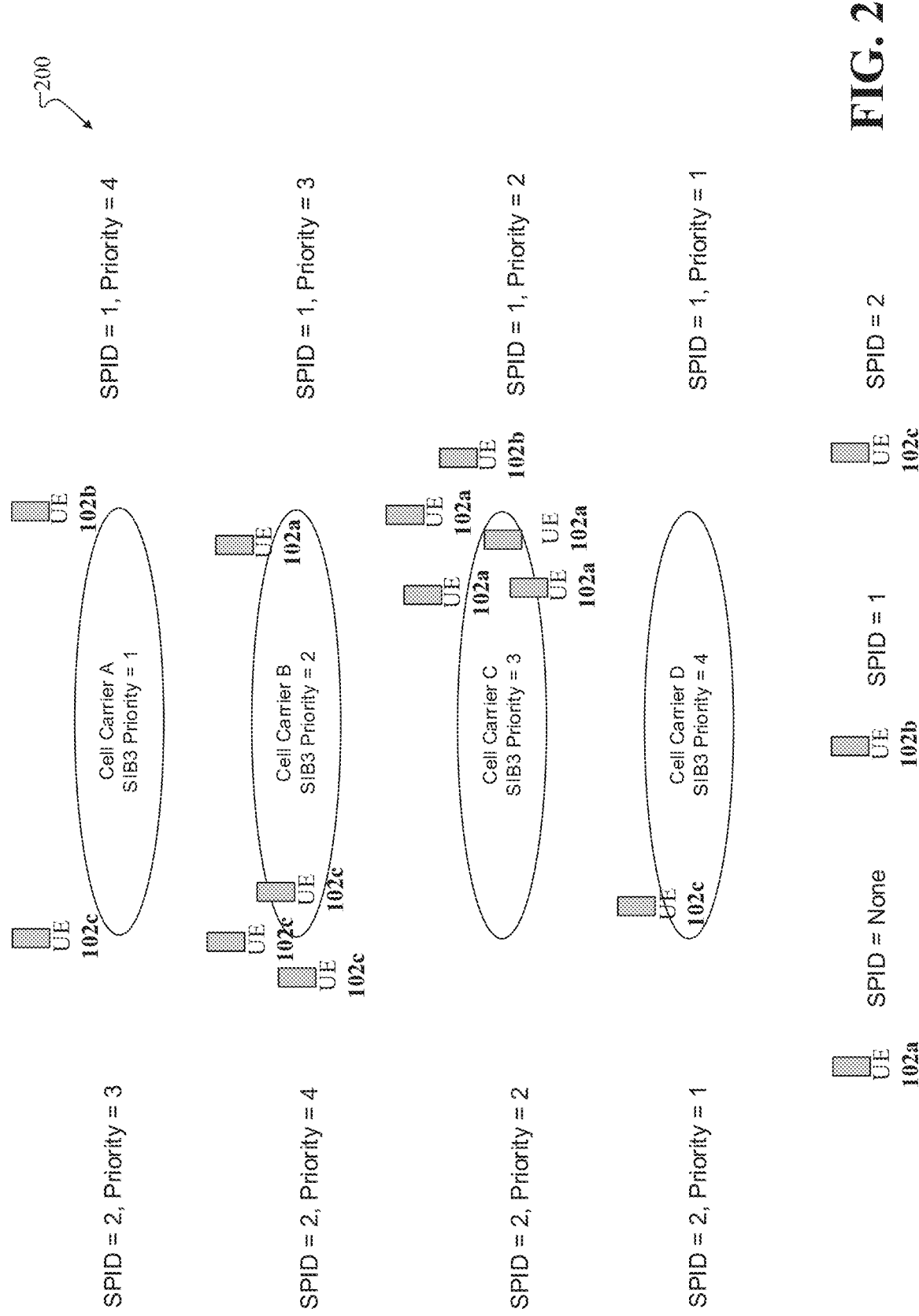
FIG. 2 illustrates an example schematic system block diagram of static allocation and priority to SPID for a UE according to one or more embodiments.

Referring now to FIG. 2, illustrated is an example schematic system block diagram of static allocation and priority to SPID for a UE according to one or more embodiments. The SPID can be defined at the subscriber level. FIG. 2 depicts an example of how UE devices (e.g., UE 102 a, b, c) are treated when static allocation and priority to SPID is used for system 200. Static allocation of the SPID and the cell prioritization forces the same group of users to be prioritized to the same cell carrier. This can lead to suboptimal service performance for customers or inefficient use of network resources. A large number of customers with the same SPID can be placed on the same cell, which can result in overloading conditions and poor service performance. For example, UEs 102a can generally default to higher priority cell carriers (e.g., cell carrier C and cell carrier D). 5G type customers can be prioritized to be allocated at the cells, which do not support 5G service with eUtran new radio dual connectivity (ENDC). However, different customers can have different requirements (e.g., fast speed to receive data, fast speed to transmit data (uplink), etc.). This disclosure allows for automatic and dynamic changes in cell priority per SPID groups to move UE devices to desired cells in order to improve customer service experience or move the UE devices to cells to maximize efficiency of network capacity.

For example, if a carrier has a large number of base UEs on it, the experience of a SPID based UE on that particular carrier may be lower than it would be on another lower priority carrier because that particular carrier is highly loaded. As depicted, the UE 102c devices on cell carrier B comprise a high priority of 4. However, they are camped on cell carrier B, which has a priority of 2 that is lower than the cell carriers C and D. However, cell carriers C and D are already loaded with the UEs 102a and thus the UEs 102c would have a lower quality experience on cell carriers C or D than they would on cell carrier B. Thus, the intent is the place the SPID based UEs on a carrier with the best throughput potential, capacity, service performance, and/or other selected criteria. To achieve this, the SPID profile for the SPID based UE can be dynamically changed.

Figure 3:
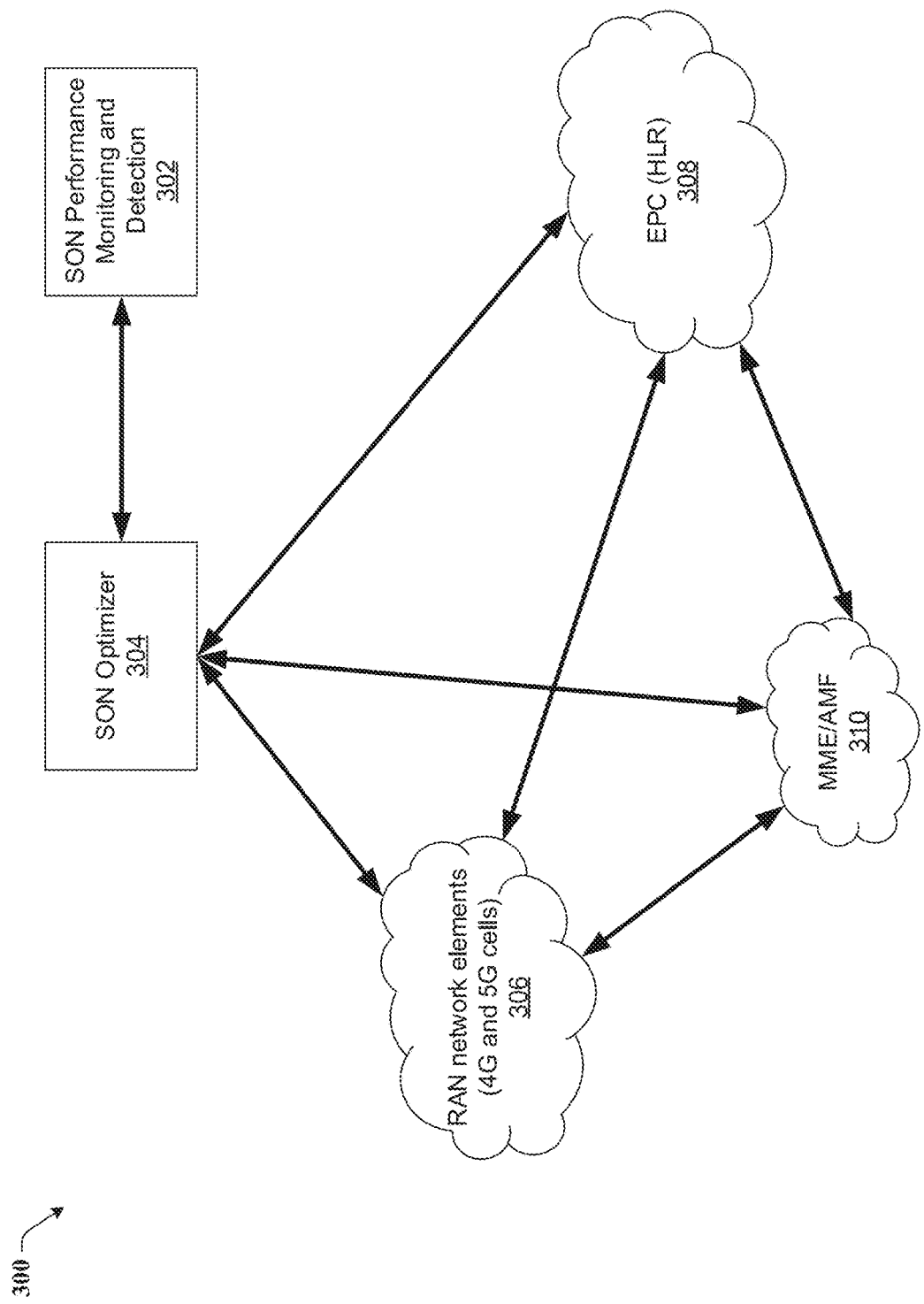
FIG. 3 illustrates an example schematic system block diagram of a system optimization network architecture according to one or more embodiments.

Referring now to FIG. 3, illustrated is an example schematic system block diagram of a system optimization network architecture 300 according to one or more embodiments. A performance monitoring and detection component 302 can detect and monitor network conditions from the RAN networks based on data received from the SON optimizer. Cells are monitored (near real-time, or periodically) to assess UE performance on each cell by the SON performance monitoring and detection component 302. The detection (e.g., in SON) finds cells which are underperforming and cells which are performing better than other cells. The performance can be assess per cell basis for all UEs or, per cell basis and per SPID or UE basis for more granularity.

SPID assignment can be performed in a home location register (HLR) core network 308 or in a mobility management element (MME)/authentication management function (AMF) 310. The home location register (HLR) core network 308 or the mobility management element (MME)/authentication management function (AMF) 310 can send the SON optimizer component 304 the SPID assignments to be utilized to develop a new cell priority allocation per SPID for the cell carriers in a sector (e.g., group). The optimizer component 304 (e.g., SON) can then apply algorithms to determine the new cell priority allocation per SPID for the cell carriers in a sector (e.g., group), which can lead to a re-distribution of the UE devices per SPID group to a better cell carrier. The new cell priority data can be sent to the RAN network elements 306. In alternate embodiments data can be share between the HLR core network 308 and the mobility MME/AMF 310, or the data from the HLR core network 308 and the MME/AMF 310 can send the data directly to the RAN network elements 306. This data can then be leveraged at the RAN network elements 306 and/or transmitted to the SON optimizer component 304.

Figure 4:
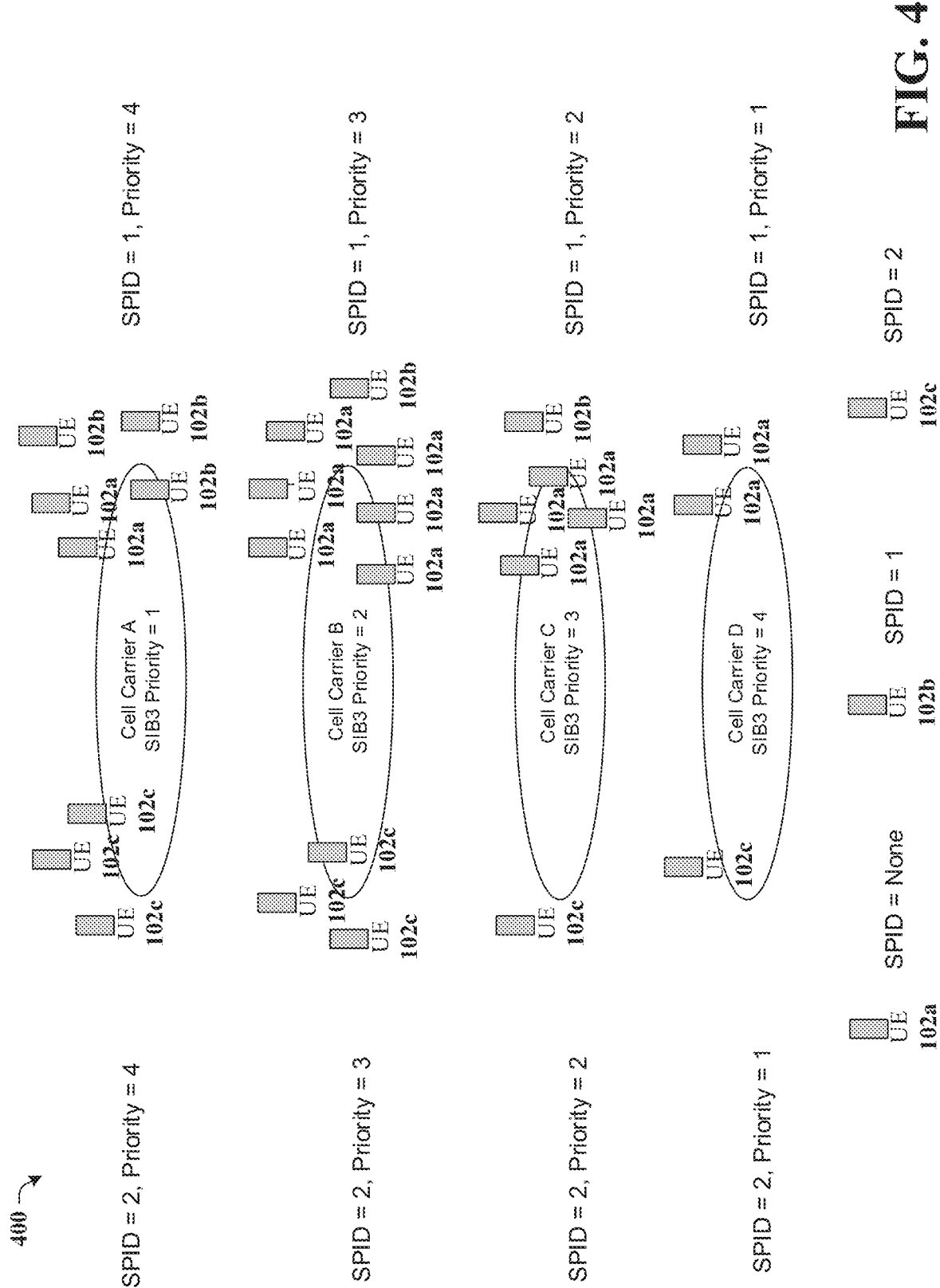
FIG. 4 illustrates an example schematic system block diagram of a suboptimal UE distribution according to one or more embodiments.
Figure 5:
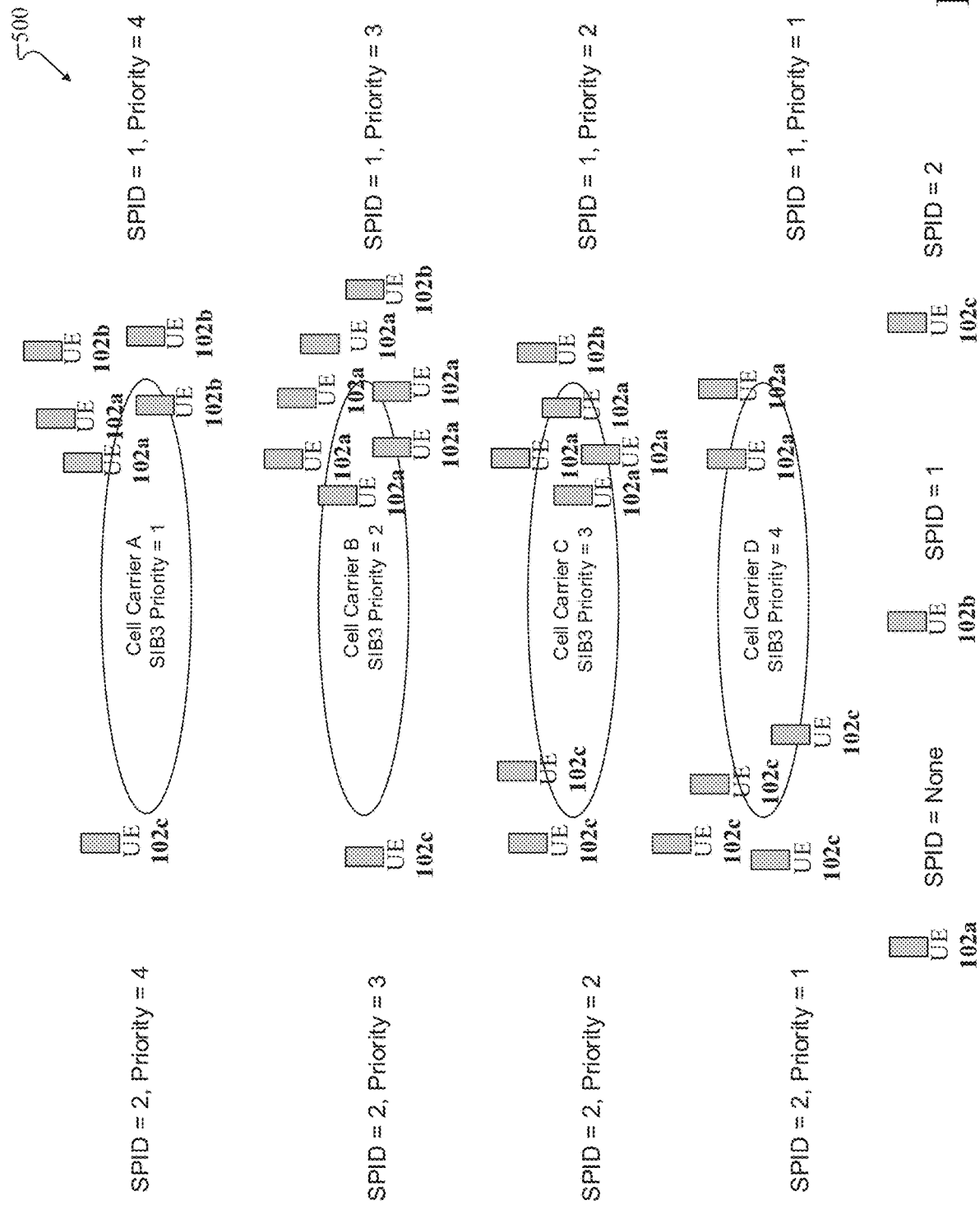
FIG. 5 illustrates an example schematic system block diagram of an optimal UE distribution according to one or more embodiments.

Referring now to FIG. 4 and FIG. 5, illustrated is an example schematic system block diagram of a suboptimal UE distribution and an optimal UE distribution, respectively, according to one or more embodiments. The UEs 102c can experience better performance on cell carriers C and D than they can on A and B due to the current high loads on cell carriers A and B and the current low loads on cell carriers C and D being relatively low as depicted by system 400 in FIG. 4. Thus, SPID priorities of the UEs 102c can be modified such that their priorities are increased to have the communication from the UEs 102c transition to cell carriers C and D as depicted by the system 500 in FIG. 5. The transition between FIG. 4 and FIG. 5 represents a dynamic change in cell carrier priority allocation for (e.g., for SPID=2 devices) to favor better cell carriers (e.g., favor cell carrier D rather than cell carrier A). The SPID cell priority can be changed based on cell performance or cell resource load (e.g., uplink physical resource blocks, number of UE, control channel element (CCE) utilization, radio frequency conditions, etc.)

For example, if cell carriers A and B are heavily loaded, then when another UE is added, the aggregate throughput of those UEs decreases due to the volume of usage on carriers A and B. However, even if carriers C and D have less total throughput potential than carriers A and B, if carriers C and D have very few users, a higher throughput can be achieved on cell carriers C and D when other UEs are added. Thus, this system can take the load and interference associated with each cell into account and place UEs dynamically with the carrier at that moment that has the highest potential throughput.

The new cell carrier prioritization parameters can be and changed in the network. As soon as the prioritization parameters are applied in the network nodes, the change effect takes place and the UEs 102 can being to move (e.g., re-select) between cell carriers based on the new cell carrier priority scheme per SPID. The automation system (e.g., SON) can monitor all or a selected group of network nodes (decided by operator) constantly or periodically, and optimization can be performed at any time when optimization trigger criteria are met. Optimization trigger criteria can be operator defined and can be driven to ensure that specific groups of users (e.g., SPIDs) have an expected grade of service (e.g., high speed upload (uplink) data connection, optimal video experience, high speed download data connection, low latency.

Figure 6:
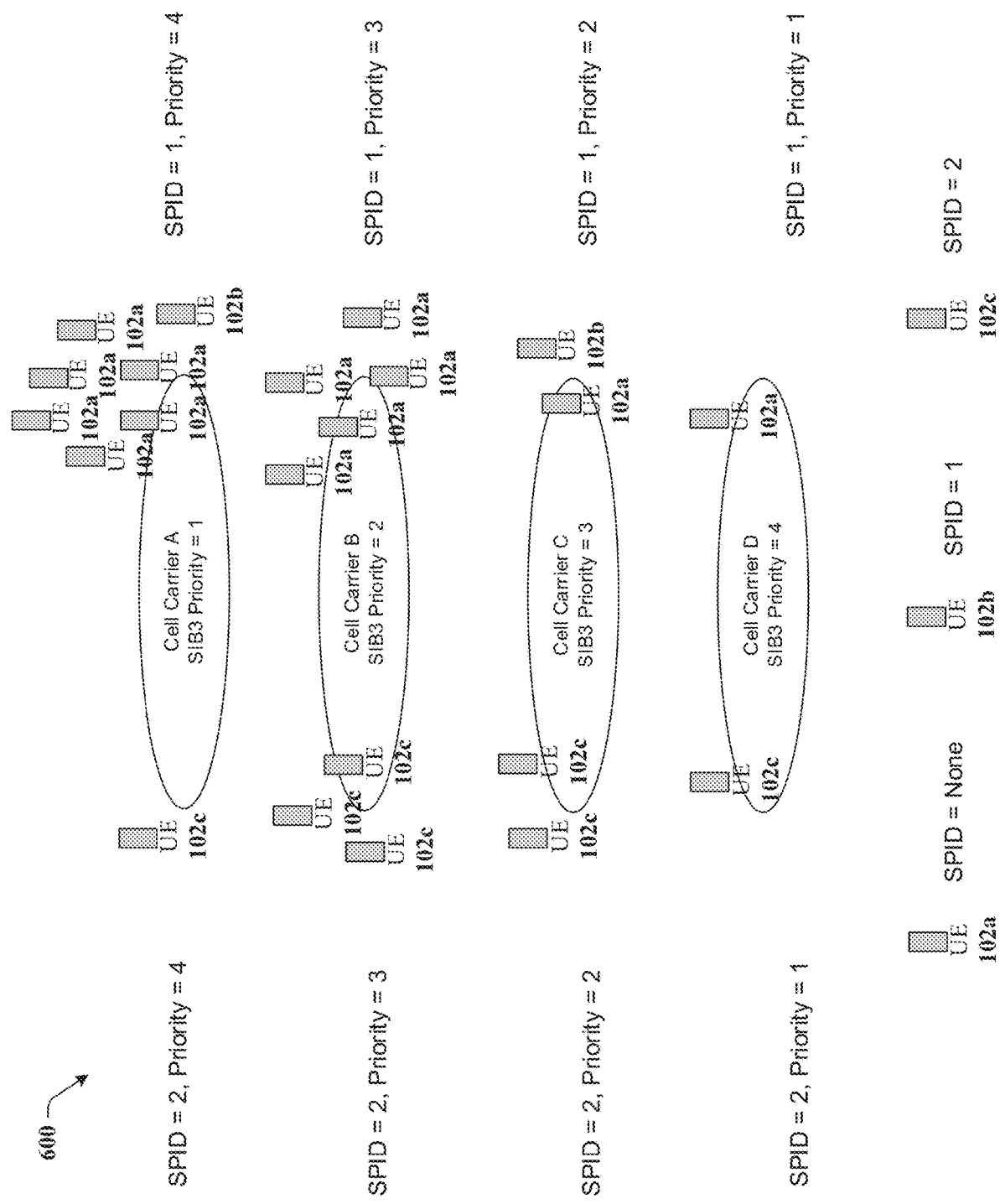
FIG. 6 illustrates an example schematic system block diagram of a suboptimal UE distribution according to one or more embodiments.
Figure 7:
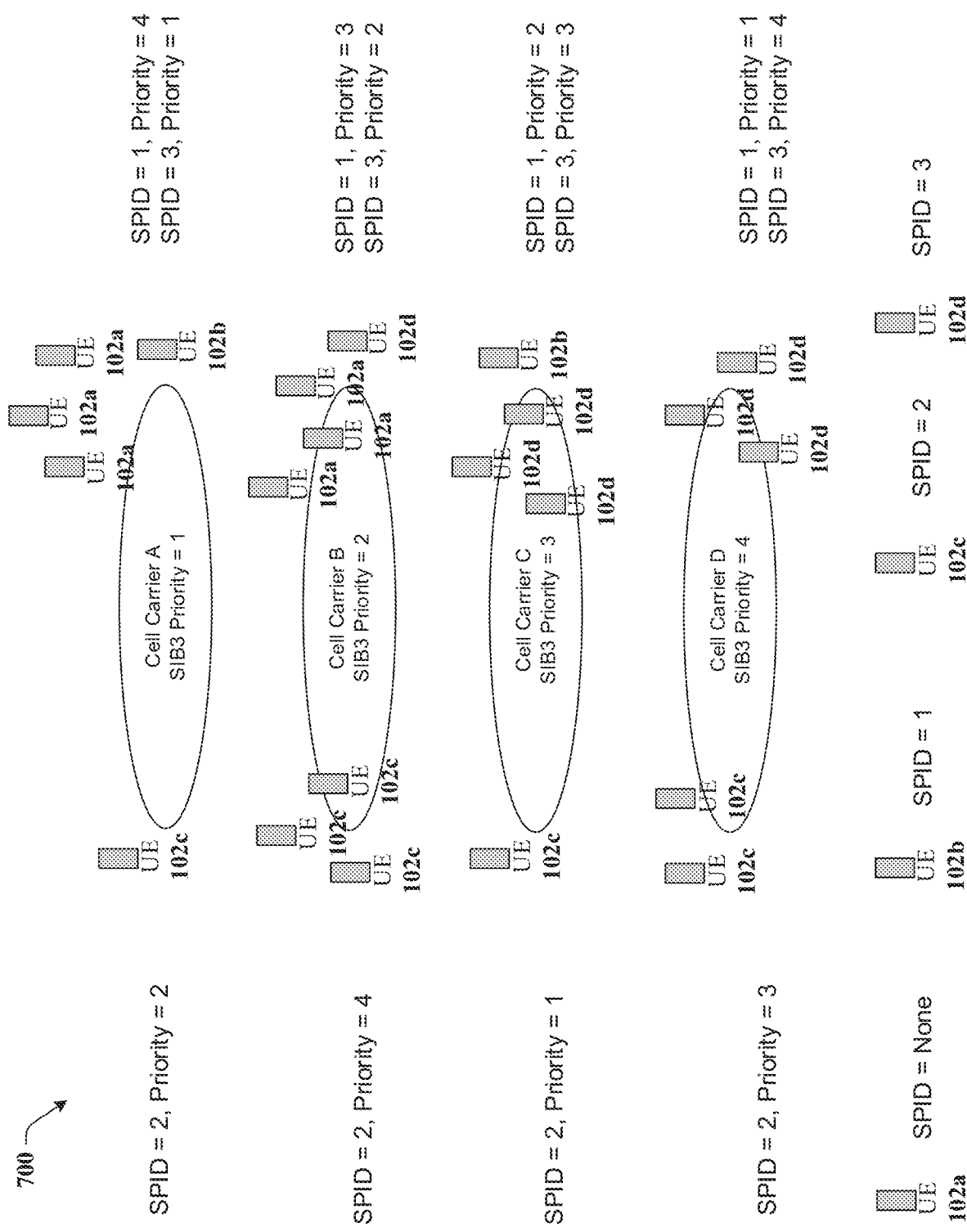
FIG. 7 illustrates an example schematic system block diagram of dynamic UE distribution comprising temporarily assigned SPIDs according to one or more embodiments.

Referring now to FIG. 6 and FIG. 7, illustrated is an example schematic system block diagram of a suboptimal UE distribution and a dynamic UE distribution comprising temporarily assigned SPIDs according to one or more embodiments. FIG. 6 depicts a large number of UEs 102*a* concentrated on cell carriers A and B, which is not optimal for network performance of system 600. Based on performance data of the cells, cell carriers C and D are currently better than cell carriers A and B. However, for a UE, the SPID can be dynamically changed (e.g., from SPID 1 to SPID 3) via the core network, which can translate to a static set of priorities for its SPID in the RAN. Thus, SPID=3 can be dynamically and temporarily assigned to the UE 102*a* devices, which then become UE 102*d* devices, in order to steer those devices in idle mode to cell carriers C and D. As depicted in FIG. 7 the UE 102*a* devices can be partitioned such that a subgroup of the UE 102*a* devices can be assigned to a temporary SPID=3 as UE 102*d* devices in system 700. Thus, the UE 102*d* devices can receive specific cell carrier priority treatment such that they are transitioned to better carriers.

Figure 8:
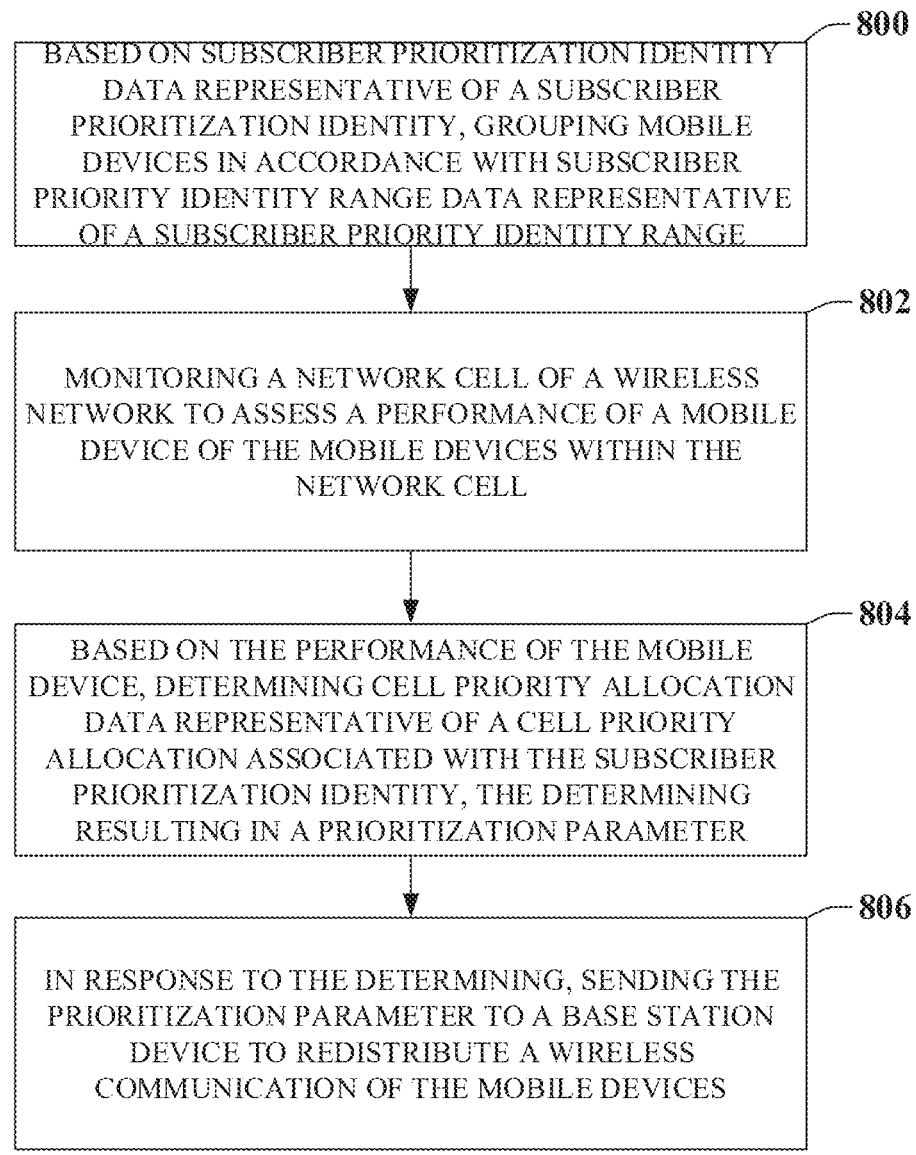
FIG. 8 illustrates an example flow diagram for a method for traffic steering via SPID for a 5G network according to one or more embodiments.

Referring now to FIG. 8, illustrated is an example flow diagram for a method for traffic steering via SPID for a 5G network according to one or more embodiments. At element 800, the method can comprise grouping (via optimizer component 304 in e.g., SON) mobile devices (e.g., UE 102*a, b, c*) in accordance with subscriber priority identity range data representative of a subscriber priority identity range based on subscriber prioritization identity data representative of a subscriber prioritization identity. At element 802, the method can comprise monitoring (via optimizer component 304 or performance monitoring and detection component 302) a network cell of a wireless network to assess a performance of a mobile device of the mobile devices (e.g., UE 102*a, b, c*) within the network cell. Additionally, based on the performance of the mobile device, at element 804, the method can comprise determining (via the optimizer component 304 in e.g., SON) cell priority allocation data representative of a cell priority allocation associated with the subscriber prioritization identity, the determining resulting in a prioritization parameter. Furthermore, in response to the determining, at element 806, the method can comprise sending (via optimizer component 304 in. e.g., SON) the prioritization parameter to a base station device (e.g., the network node 104 of the RAN network elements 306) to redistribute a wireless communication of the mobile devices (e.g., UE 102*a, b, c*).

Figure 9:
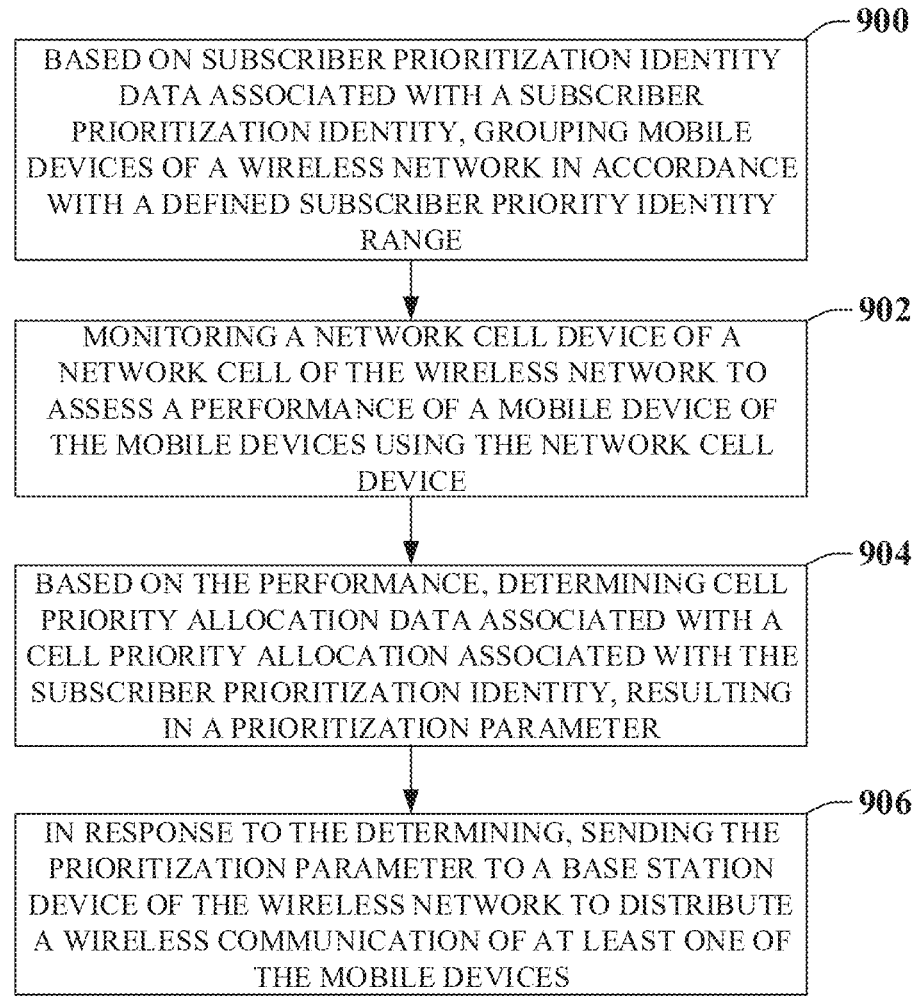
FIG. 9 illustrates an example flow diagram for a system for traffic steering via SPID for a 5G network according to one or more embodiments.

Referring now to FIG. 9, illustrates an example flow diagram for a system for traffic steering via SPID for a 5G network according to one or more embodiments. At element 900, a system can facilitate grouping mobile devices (e.g., UE 102*a, b, c*) of a wireless network in accordance with a defined subscriber priority identity range based on subscriber prioritization identity data associated with a subscriber prioritization identity. At element 902, the system can facilitate monitoring (via optimizer component 304 or performance monitoring and detection component 302 in e.g., SON) a network cell device of a network cell of the wireless network to assess a performance of a mobile device of the mobile devices (e.g., UE 102*a, b, c*) using the network cell device. Based on the performance, the system can facilitate determining (via optimizer component 304 in e.g., SON) cell priority allocation data associated with a cell priority allocation associated with the subscriber prioritization identity, resulting in a prioritization parameter at element 904. Furthermore, in response to the determining, the system can facilitate sending the prioritization parameter to a base station device (e.g., the network node 104) of the wireless network (e.g., the RAN network elements 306) to distribute a wireless communication of at least one of the mobile devices (e.g., UE 102*a, b, c*) at element 906.

Figure 10:
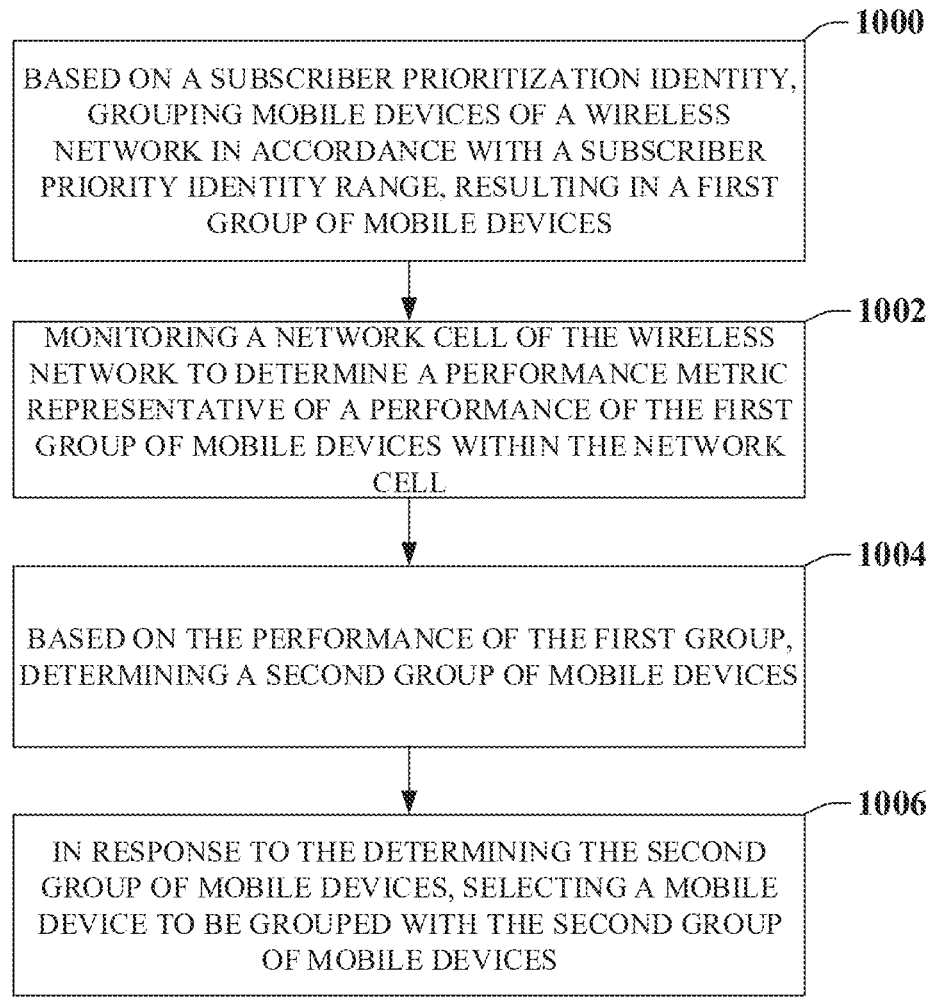
FIG. 10 illustrates an example flow diagram for a machine-readable medium for traffic steering via SPID for a 5G network according to one or more embodiments.

Referring now to FIG. 10, illustrated is an example flow diagram for a machine-readable medium for traffic steering via SPID for a 5G network according to one or more embodiments. At element 1000, a machine-readable storage medium that can perform the operations comprising grouping mobile devices of a wireless network in accordance with a subscriber priority identity range, resulting in a first group of mobile devices (e.g., UE 102*a, b, c*) based on a subscriber prioritization identity. At element 1002, the machine-readable storage medium can perform the operations comprising monitoring (via optimizer component 304 or performance monitoring and detection component 302 in e.g., SON) a network cell of the wireless network to determine a performance metric representative of a performance of the first group of mobile devices (e.g., UE 102*a, b, c*) within the network cell. Furthermore, at element 1004, the machine-readable storage medium can perform the operations comprising determining (via optimizer component 304 in e.g., SON) a second group of mobile devices (e.g., UE 102*d*) based on the performance of the first group. Additionally, at element 1006, the machine-readable storage medium can perform the operations comprising selecting a mobile device (e.g., UE 102*a*) to be grouped with the second group of mobile devices (e.g., UE 102*d*) in response to the determining the second group of mobile devices (e.g., UE 102*d*).

Figure 11:
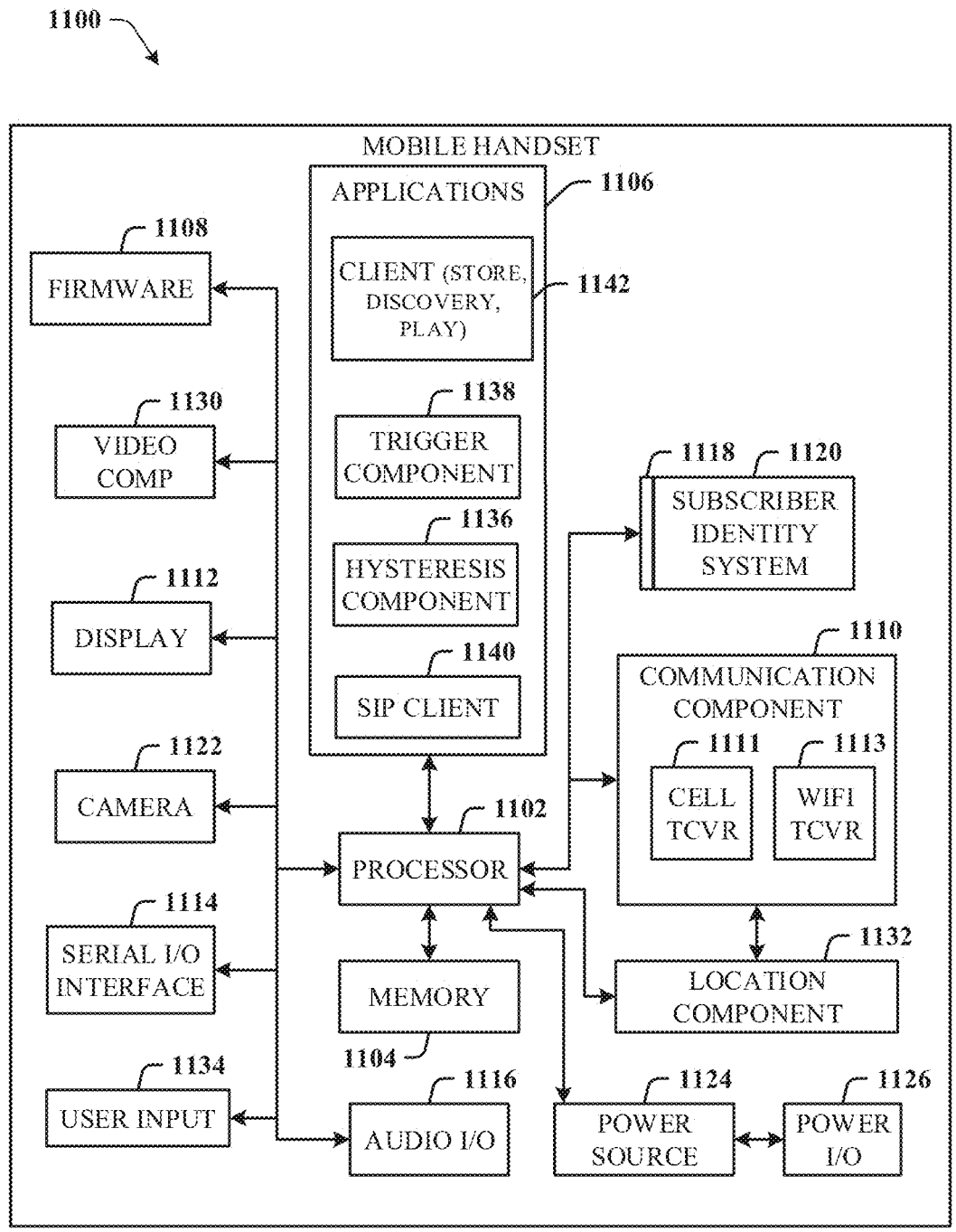
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
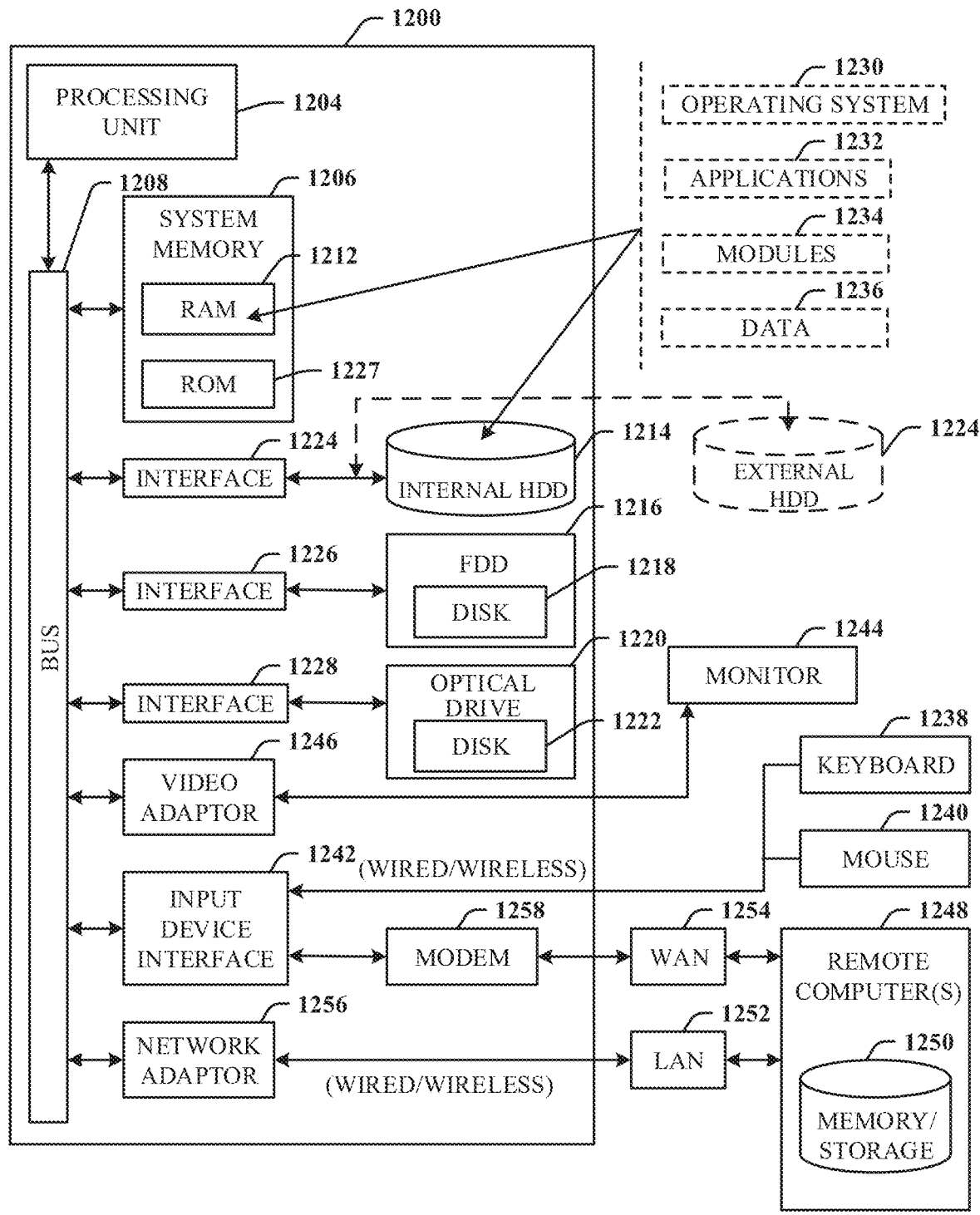
FIG. 12 illustrates an example block diagram of an example computer operable to engage in a system architecture that facilitates secure wireless communication according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
assigning, by a network device comprising a processor, mobile devices to subscriber priority identifiers based on classifications of the mobile devices, wherein respective prioritization parameters of the subscriber priority identifiers override cell carrier prioritization data broadcast in a system information block;
monitoring, by the network device, a network cell of network cells to assess a performance of a mobile device of the mobile devices within the network cell;
based on the performance of the mobile device, a threshold performance of the network cell that has been previously defined, and the classifications, generating, by the network device, a first prioritization parameter for a first subscriber priority identifier of the subscriber priority identifiers, wherein the first prioritization parameter comprises respective first cell priorities assigned to the network cells for the first subscriber priority identifier, wherein the subscriber priority identifiers comprise a second subscriber priority identifier comprising a second prioritization parameter comprising respective second cell priorities assigned to the network cells for the second subscriber priority identifier, and wherein at least two of the respective first cell priorities assigned to two network cells of the network cells are different from the respective second cell priorities assigned to the two network cells; and
sending, by the network device, the first prioritization parameter to a base station to redistribute respective communications of at least one of the mobile devices among the network cells based on the first prioritization parameter.

2. The method of claim 1, wherein the generating further comprises generating the respective prioritization parameters for the subscriber priority identifiers.

3. The method of claim 1, wherein the monitoring comprises assessing respective performances of the mobile devices within the network cells.

4. The method of claim 1, further comprising:
in response to sending the first prioritization parameter, facilitating, by the network device, redistributing of the respective communications of at least one of the mobile devices among the network cells.

5. The method of claim 4, wherein facilitating the redistributing of the respective communications comprises redistributing the respective communication of the mobile device with a different network cell of the network cells than the network cell.

6. The method of claim 1, wherein monitoring the network cell is performed repetitively without any time delay.

7. The method of claim 1, wherein monitoring the network cell is performed periodically according to a time period.

8. A system, comprising:
a processor; and
a memory that stores executable instructions that, when executed by the processor, facilitate performance of operations, comprising:
assigning subscriber prioritization identities to mobile devices based on classifications of the mobile devices, wherein respective prioritization parameters of the subscriber prioritization identities override cell carrier prioritization data broadcast in a system information block;

monitoring a network cell of network cells to assess a performance of a mobile device of the mobile devices using the network cell;

based on the performance, a previously defined threshold performance of the network cell, and the classifications creating a first prioritization parameter for a first subscriber prioritization identity of the subscriber prioritization identities, wherein the first prioritization parameter comprises respective first cell priorities assigned to the network cells for the first subscriber prioritization identity, wherein the subscriber prioritization identities comprise a second subscriber prioritization identity comprising a second prioritization parameter comprising respective second cell priorities assigned to the network cells for the second subscriber prioritization identity, and wherein at least two of the respective first cell priorities assigned to two network cells of the network cells are different from the respective second cell priorities assigned to the two network cells; and sending the first prioritization parameter to a base station of the network cell to distribute respective communications of at least one of the mobile devices among the network cells based on the first prioritization parameter.

9. The system of claim 8, wherein the performance is based on a threshold value associated with an uplink data connection of the mobile device.

10. The system of claim 8, wherein the performance is based on a quality of a video being displayed by a display screen of the mobile device.

11. The system of claim 8, wherein the performance is based on a threshold value associated with a download data connection of the mobile device.

12. The system of claim 8, wherein the performance is based on a latency threshold value with the communication of the at least one of the mobile devices.

13. The system of claim 8, wherein monitoring the network cell is performed at a determined time period.

14. The system of claim 8, wherein the first subscriber prioritization identity is a temporary subscriber prioritization identity.

15. A non-transitory machine-readable medium, comprising executable instructions that, when executed by a processor, facilitate performance of operations, comprising:

grouping mobile devices of a network in accordance with subscriber priority identities, resulting in a first group of mobile devices grouped by a first subscriber priority identity of the subscriber priority identities, wherein the subscriber priority identities correspond to classifications of the mobile devices, wherein respective prioritization parameters of the subscriber priority identities override cell carrier prioritization data broadcast in a system information block, and wherein the respective prioritization parameters of the subscriber priority identities comprise:

a first prioritization parameter comprising respective first cell priorities assigned to network cells for the first subscriber priority identity of the subscriber priority identities, and a second prioritization parameter comprising respective second cell priorities assigned to the network cells for a second subscriber priority identity of the subscriber priority identities, wherein at least two of the respective first cell priorities assigned to two network cells of network cells are different from the respective second cell priorities assigned to the two network cells;

monitoring a network cell of the network cells to determine a performance metric representative of a performance of the first group of mobile devices within the network cell;

based on the performance of the first group, a threshold performance of the network cell that has been previously defined, and the classifications, assigning a second group of mobile devices associated with the second subscriber priority identity of the subscriber priority identities to the network cell; and in response to assigning the second group of mobile devices to the network cell, selecting a mobile device of the first group to be moved to the second group of mobile devices associated with the second subscriber priority identity.

16. The non-transitory machine-readable medium of claim 15, wherein selecting the mobile device to be grouped with the second group of mobile devices is based on a location of the mobile device.

17. The non-transitory machine-readable medium of claim 15, wherein selecting the mobile device to be grouped with the second group of mobile devices is based on user experience data representative of a user experience associated with the mobile device.

18. The non-transitory machine-readable medium of claim 15, wherein selecting the mobile device to be grouped with the second group of mobile devices is based on a data streaming service associated with the mobile device.

19. The non-transitory machine-readable medium of claim 15, wherein selecting the mobile device to be grouped with the second group of mobile devices is based on a type of the mobile device.

20. The non-transitory machine-readable medium of claim 15, wherein the first subscriber priority identity a temporary subscriber prioritization identity.

\* \* \* \* \*